T. C. LORD.
Horse Hay-Rake.
No. 214,047. Patented April 8, 1879.
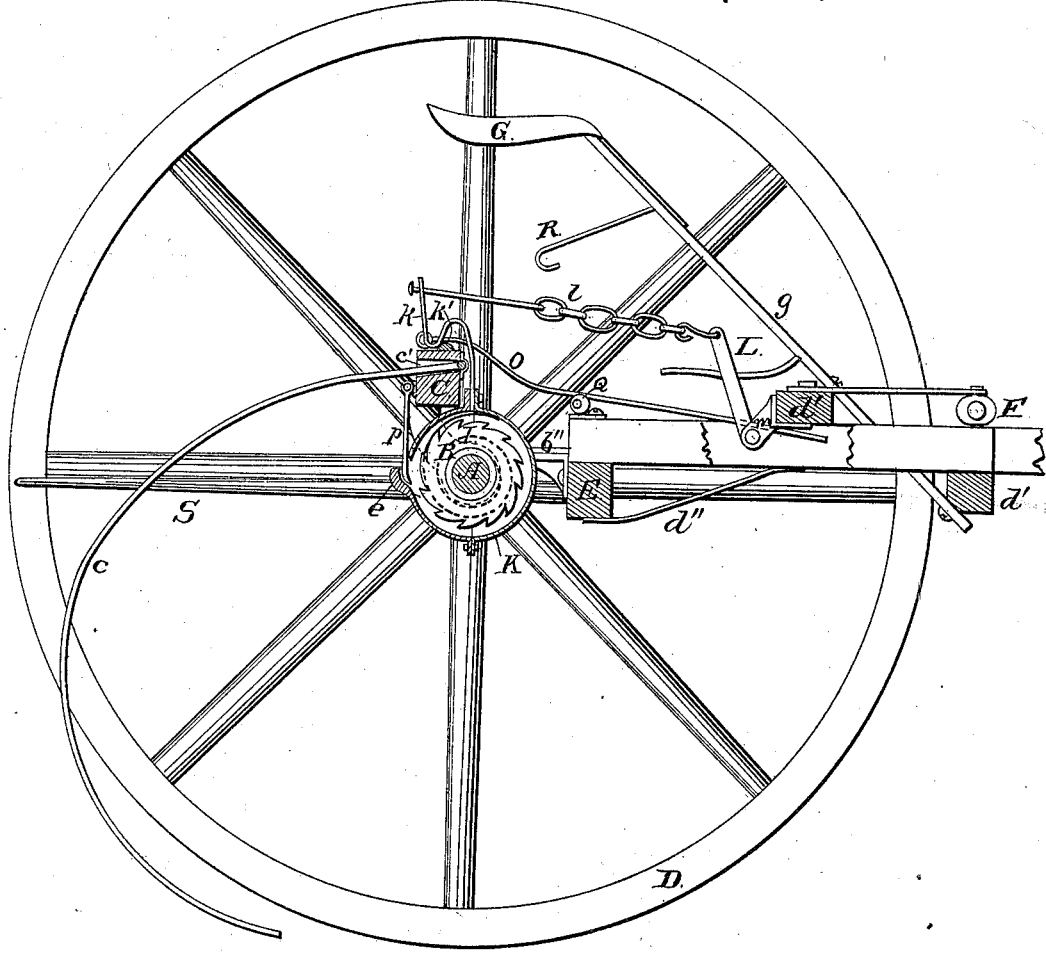
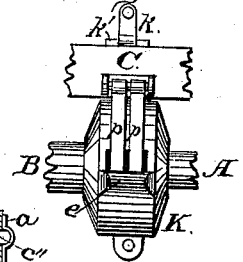
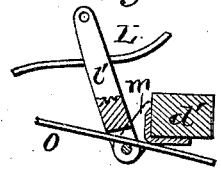
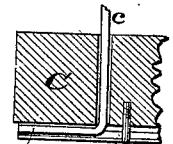
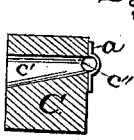
Attest:
F. B. Brock
D. L. Stuart
Inventor:
Tyler C. Lord,
by A. McCallum
Atty.

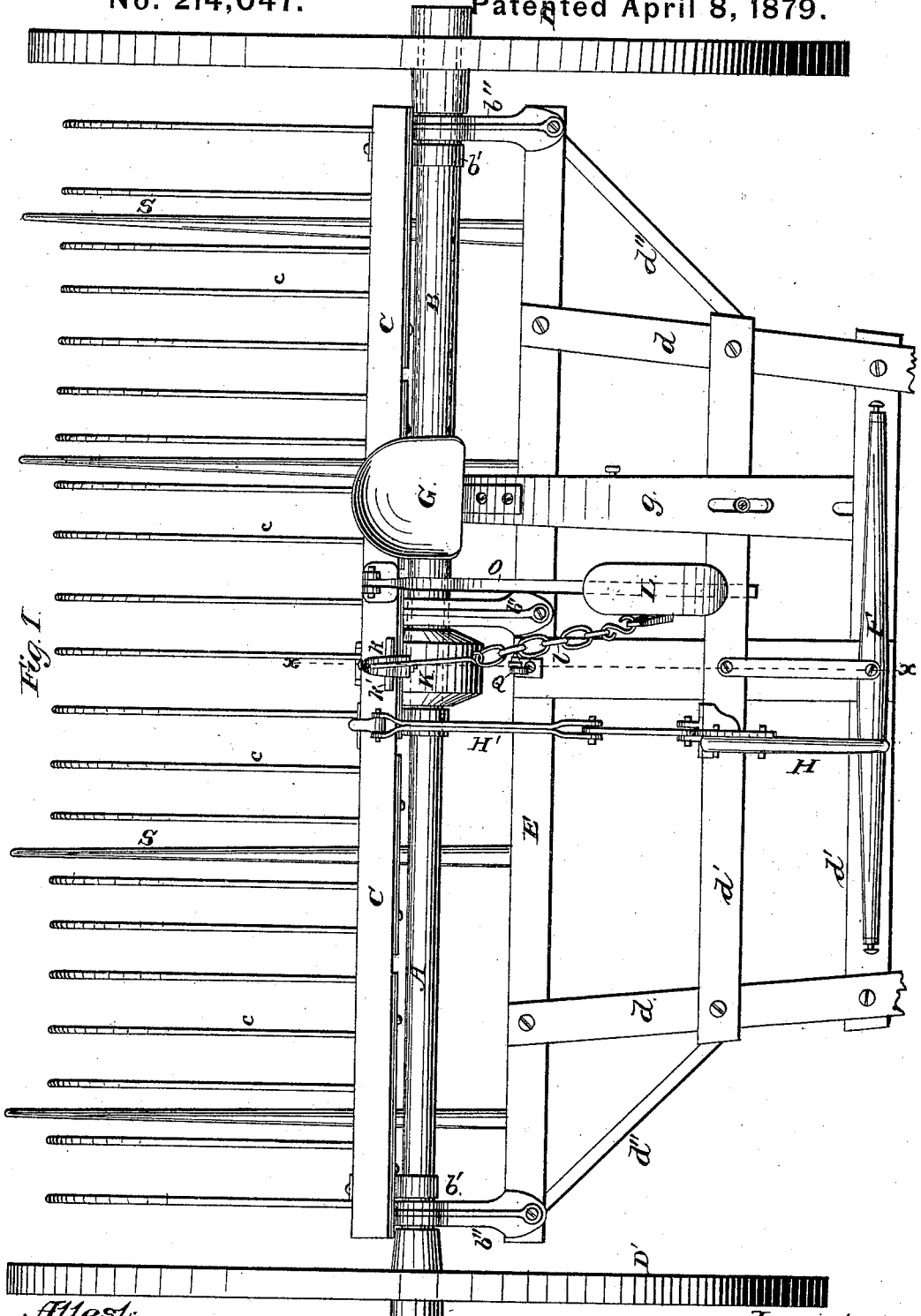

UNITED STATES PATENT OFFICE.

TYLER C. LORD, OF JOLIET, ILLINOIS.

IMPROVEMENT IN HORSE HAY-RAKES.

Specification forming part of Letters Patent No. 214,047, dated April 8, 1879; application filed December 27, 1878.

*To all whom it may concern:*

Be it known that I, TYLER C. LORD, of Joliet, in the county of Will and State of Illinois, have invented certain new and useful Improvements in Horse Hay-Rakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to horse hay-rakes of the class known as "sulky-rakes," on which the driver sits and controls the operation of the machine; and the invention consists in certain improvements in the construction and operation of the rake for which I received the grant of Letters Patent January 8, 1878, numbered 199,077, all as hereinafter more fully set forth.

In the accompanying drawings, Figure 1 is a top-plan view of my improved rake. Fig. 2 is a vertical section of the same, taken on the line $x\ x$, Fig. 1. Fig. 3 is a detail view, showing the automatic dumping device in rear elevation. Fig. 4 is a detail view, showing the friction-brake and device for regulating the motion of the rake in falling after the operation of dumping is accomplished. Fig. 5 is a side elevation of one of the boxes or caps for securing the rake-teeth. Fig. 6 is a horizontal section of the pressure-bar, showing the method of securing the rake-teeth, and Fig. 7 a transverse section of the same, showing the form of the slots in the pressure-bar.

Referring to the parts by letters, A represents an axle or shaft, a portion of which passes through, or partially through, a hollow shaft or tube B, which may be ordinary gas-pipe.

D D′ are the wheels, one of which, D′, is keyed or otherwise secured to the axle A, so as to revolve with it, while the other, D, is rigidly secured to the outer end of the hollow shaft or axle B, so as to revolve with it, but entirely independent of the shaft A, each wheel thus having its own axle, and revolving together or independently of each other, as occasion requires.

C is the rake-head, in which the teeth $c$ are held, and which serves the purpose of a tooth-holder and pressure-bar combined, the said bar or head being in one piece. A series of slots, $c'$, made tapering in form throughout their length, and flaring toward the rear of the machine, are cut transversely through the pressure-bar. The rake-head has also a groove, $c''$, formed in its forward side throughout its length.

$a$ represents a cap or caps having a circular recess formed on the inner side. These caps or boxes are secured to the rake-head by screws or bolts passed through the holes $a'$, or in any other suitable manner.

The inner ends of the rake-teeth are formed with portions $c'''$ bent at right angles to the main portion of the tooth, and in placing the teeth in position the free ends are passed through the slots $c'$ until their bent portions rest in the groove $c''$. The boxes or caps $a$ being then secured in position, the teeth are secured to the rake-head, and by reason of the tapering form of the slots $c'$ sufficient play of the teeth in a vertical direction is provided for without in any way loosening the tooth or impairing its spring-power.

If desired, the securing cap or box $a$ may be made in one piece or strip; but I prefer to make it in sections, so that one may be removed for the purpose of replacing a tooth without affecting the whole rake-head.

The groove $c''$ in the rake-head is preferably made so as to receive about one-third of the diameter of the bent portion or arm of the rake-tooth, the circular recess in the box or cap receiving the remaining two-thirds; but, as is obvious, this arrangement may be changed or reversed as found most convenient.

This method of fastening the teeth to the rake-head is clearly shown by Figs. 5, 6, and 7 of the drawings, and the rake so constructed constitutes what is called a "drop-tooth rake," and by this peculiar construction of the parts I obviate the necessity for the extra pressure-bar heretofore commonly used, and also do away with the split heads or caps heretofore employed. The independent motion or play of the teeth, due to the tapering form of the slots $c'$, enables them to pass over stubble or uneven ground without difficulty.

The rake-head is attached or pivoted to the axles by straps or brackets $b'$, so as to turn freely thereon.

E is a cross-bar, to which the thills $d$ are attached, said thills being suitably braced by cross-bars $d'$ and diagonal braces $d''$. F is a single-tree, and G is an adjustable driver's seat supported on a bar, $g$, which is secured to the cross-bars $d'$. The bar E is attached or pivoted to the axles by means of straps $b''$. H is a lever pivoted to the rear cross-bar $d'$, convenient for operation by the driver. Its rear end is pivoted to the connecting-rod H', which, in turn, is pivoted to the rake-head C. I I are ratchet-wheels, arranged in comparatively close proximity to each other, one secured to the inner end of the hollow axle or shaft B, so as to revolve with it, and the other keyed or otherwise secured to the axle or shaft A, said ratchet-wheels being constructed and arranged for operation substantially as described in Patent No. 199,077, hereinbefore referred to.

K is a hood or casing seated loosely on the shafts or axles A B, so that it may oscillate thereon. Said casing serves to guard and prevent dirt, dust, or other extraneous matter from getting at and clogging the action of the ratchet-wheels. A spring-catch, $k$, extends upward from the hood K, and engages with a lug, $k'$, which is secured on the top of the rake-head C when the rake is not in the act of dumping.

$l$ is a chain or rope which is connected at one end to the spring-catch $k$, its other end being secured to a lever, $l'$, the function of which is hereinafter more fully described.

On releasing the spring-catch $k$ by means of the lever $l'$ and connecting-chain, the hood K is thrown forward or rotated on its axis by the action of the spring.

$p$ $p$ are pawls, which hang pendent on the pressure-bar or rake-head C, the free ends passing through an opening in the hood K, one pawl being provided for each of the ratchet-wheels I, and so arranged as to engage with the teeth of the ratchet-wheels when the machine is operated to discharge a load. $e$ is a projection or cam formed on the hood K at the point or opening therein through which the ends of the pawls pass.

The operation of this part of the device is as follows: When the spring-catch $k$ is released from contact with the bar C by the action of the lever $l'$ and connecting-chain, the hood K is rotated, as before described, and the cam or projection $e$ moves the pawls $p$ into gearing or contact with the ratchet-wheels I, thereby elevating the rake-head to dump the load.

$l'$ represents the operating-lever, which is provided with a treadle, L, and located in convenient position for operation by the foot of the driver; but if considered more desirable it may be provided with an upwardly-projecting handle, so as to be operated by hand. It is pivoted between brackets or projections $m$, and its lower end is slotted or bifurcated, so as to receive a friction-bar, O, the end of which passes through said slot or bifurcation above the pivot-bolt or journal on which the lever $l'$ turns.

This friction-bar O is pivoted at one end to the rake-head C, its other or free end passing through the slot or bifurcation in the lever, as above described. It is bent downward in inclined form, as clearly shown in Fig. 2 of the drawings, and the bracket $m$, to which the lever $l'$ is pivoted, being inclined in the opposite direction, the gravity of the lever causes it to impinge on the friction-bar O, and presses the latter between the pivot-pin and the upper end of the bifurcation or slot. In this way the friction between the bar O and the lever operates as a brake, and serves to ease the descent of the rake-teeth to the ground after the operation of dumping is completed. The driver, by pressing his heel on the rear end of the treadle, can also at his will increase the friction between the lever and the bar O, and thereby arrest the downward motion of the rake at any desired point, or retain it in an elevated position for any desired length of time—an arrangement which is very desirable in the operation of such devices when the machine has to pass over accumulations of hay, or in turning the machine, &c.

Q is a cam-wheel or eccentric adjustably secured on the thill-frame, and R is a hook-rod pivoted to the seat-support $g$.

S represents the stripping-teeth, the inner ends of which are secured to the cross-bar E of the thill-frame.

The general operation of the machine is as follows: When drawn along with the rake-teeth in contact with the ground, the rake will gather up the hay until a sufficient quantity has been accumulated. In order to dump or clear the machine from the hay thus gathered, all that is necessary is to press momentarily and lightly on the forward portion of the treadle attached to the lever $l'$, when, said lever being connected by the chain to spring-catch $k$, the latter is disengaged from the rake-head, the hood K rotated, the pawls brought into contact with the ratchet-wheels I, and through the forward motion of the machine the rake-head is elevated, the teeth S stripping the hay from the spring rake-teeth in the usual manner. As the rake-head continues to revolve it again comes in contact with the spring-catch $k$, and, pressing the latter against the cam or eccentric Q, the spring-hook is forced over the lug $k'$ on the rake-head, and again comes in frictional contact therewith. The cam-stop Q is made adjustable, so as to come in contact with and operate the spring-catch, as before described, and regulate the degree of elevation of the rake-head as found most desirable, and the adjustment of the stop-cam may be accomplished by moving the device in a longitudinal direction to or from the hood K, or laterally to or from the spring-catch $k$.

The descent of the rake is retarded or arrested by means of the friction-rod o, as before described.

The rake may also be retained in an elevated position for convenience of transportation by engaging the hook R with the rake-head, or an eye or staple secured thereto.

In heavy raking, when it is desirable to keep the teeth down or in close contact with the ground, all that is necessary is for the operator to press his foot on the rear end of the treadle attached to the lever l'.

By operating the lever H the rake-teeth may be elevated by hand-power if desired.

Having thus described my invention, what I claim as new, and desire to secure by Letters Patent, is—

1. The hood or casing K, having the cam-projection e, operating in combination with the pawls p, ratchet-wheels I, and bar or head C, substantially as and for the purpose specified.

2. The lever l', chain or rope l, and spring-catch k, operating in combination with the hood K, ratchets I, pawls p, and head C, substantially as and for the purpose specified.

3. The combination of the adjustable stop-cam Q with the spring-catch k and head or bar C, substantially as and for the purpose specified.

4. The pivoted lever l', provided with a slot at or near its lower end, in combination with the friction-bar O, hinged to the rake-head and passing through the pivoted lever and between it and the pivot-pin, and arranged to operate in the manner substantially as and for the purpose set forth.

In testimony that I claim the foregoing as my own I affix my signature in presence of two witnesses.

TYLER C. LORD.

Witnesses:
   THOS. H. HUTCHINS,
   WILLIAM H. FLAGG.